(12) United States Patent
Griese et al.

(10) Patent No.: US 7,588,645 B2
(45) Date of Patent: Sep. 15, 2009

(54) STRIPPING FLOOR FINISHES USING COMPOSITION THAT THICKENS FOLLOWING DILUTION WITH WATER

(75) Inventors: Gregory G. Griese, Hudson, WI (US); Mark D. Levitt, Saint Paul, MN (US); Brian R. Leafblad, Saint Paul, MN (US); Minyu Li, Oakdale, MN (US); Robert D. P. Hei, Baldwin, WI (US); Steven J. Lange, St. Paul, MN (US); Jan E. Shulman, Newtown, PA (US)

(73) Assignee: Ecolab Inc., St. Paul, MN (US)

( * ) Notice: Subject to any disclaimer, the term of this patent is extended or adjusted under 35 U.S.C. 154(b) by 659 days.

(21) Appl. No.: 11/396,146

(22) Filed: Mar. 31, 2006

(65) Prior Publication Data

US 2006/0234890 A1 Oct. 19, 2006

Related U.S. Application Data

(63) Continuation-in-part of application No. 11/107,307, filed on Apr. 15, 2005, now Pat. No. 7,365,046.

(51) Int. Cl.
*C11D 3/20* (2006.01)

(52) U.S. Cl. .................... 134/38; 134/40; 510/201; 510/206; 510/212; 510/214

(58) Field of Classification Search ............... 134/38, 134/40; 510/201, 206, 212, 214
See application file for complete search history.

(56) References Cited

U.S. PATENT DOCUMENTS

| | | | |
|---|---|---|---|
| 3,094,491 A | 6/1963 | Greminger et al. | |
| 3,664,962 A | 5/1972 | Kelly et al. | |
| 4,294,729 A | 10/1981 | Bakos et al. | |
| 4,445,939 A | 5/1984 | Hodson | |
| 4,517,330 A | 5/1985 | Zdanowski et al. | |
| 4,592,787 A | 6/1986 | Johnson | |
| 4,732,695 A | 3/1988 | Francisco | |
| 4,999,216 A | 3/1991 | Gaske et al. | |
| 5,080,822 A | 1/1992 | VanEenam | |
| 5,080,831 A | 1/1992 | Van Eenam | |
| 5,091,211 A | 2/1992 | Richard | |
| 5,096,501 A | 3/1992 | Dishart et al. | |
| 5,158,710 A | 10/1992 | Van Eenam | |
| 5,319,018 A | 6/1994 | Owens et al. | |
| 5,364,551 A | 11/1994 | Lentsch et al. | |
| 5,419,848 A | 5/1995 | Van Eenam | |
| 5,453,451 A | 9/1995 | Sokol | |
| 5,518,661 A | 5/1996 | Langford et al. | |
| 5,529,887 A | 6/1996 | Horn et al. | |
| 5,585,341 A | 12/1996 | Van Eenam | |
| 5,637,559 A | 6/1997 | Koreltz et al. | |
| 5,696,072 A | 12/1997 | Nercissiantz et al. | |
| 5,721,204 A | 2/1998 | Maxwell et al. | |
| 5,744,440 A | 4/1998 | Liu | |
| 5,773,487 A | 6/1998 | Sokol | |
| 5,783,538 A | 7/1998 | Totoki et al. | |
| 5,786,319 A | 7/1998 | Pedersen et al. | |
| 5,817,612 A | 10/1998 | Distaso | |
| 5,830,937 A | 11/1998 | Shavol et al. | |
| 5,849,682 A | 12/1998 | Van Eenam | |
| 6,010,995 A | 1/2000 | Van Eenam | |
| 6,096,383 A | 8/2000 | Berg et al. | |
| 6,197,844 B1 | 3/2001 | Hamrock et al. | |
| 6,228,433 B1 | 5/2001 | Witt | |
| 6,239,090 B1 * | 5/2001 | Marquis et al. | 510/201 |
| 6,316,535 B1 | 11/2001 | Caldwell et al. | |
| RE37,849 E | 9/2002 | Pokorny | |
| 6,544,942 B1 | 4/2003 | Smith et al. | |
| 6,583,101 B1 * | 6/2003 | Wiseth et al. | 510/407 |
| 6,586,380 B2 | 7/2003 | Marquis et al. | |
| 6,630,434 B2 | 10/2003 | Besse et al. | |
| 6,846,793 B1 | 1/2005 | Griese | |
| 2002/0028621 A1 | 3/2002 | Levitt et al. | |
| 2002/0082178 A1 | 6/2002 | Besse et al. | |
| 2002/0175092 A1 | 11/2002 | Stulens et al. | |
| 2003/0031801 A1 | 2/2003 | Olson et al. | |
| 2003/0119686 A1 * | 6/2003 | Machac et al. | 510/201 |
| 2003/0125226 A1 * | 7/2003 | Lewis | 510/214 |
| 2003/0207782 A1 * | 11/2003 | Wiseth et al. | 510/407 |
| 2004/0086320 A1 | 5/2004 | Policicchio et al. | |
| 2004/0121932 A1 | 6/2004 | Griese et al. | |
| 2004/0127378 A1 | 7/2004 | Sherry et al. | |

FOREIGN PATENT DOCUMENTS

WO WO 98/17734 4/1998

\* cited by examiner

*Primary Examiner*—Gregory E Webb
(74) *Attorney, Agent, or Firm*—Andrew D. Sorensen; Anneliese S. Mayer; Amy J. Hoffman

(57) ABSTRACT

Floor finishes can be stripped using a substantially nonchlorinated concentrate comprising a floor finish dissolver and an at least partially water-unactivated water thickener. The concentrate is diluted with water at an intended use location to activate the water thickener and noticeably increase within sixty minutes or less the viscosity of the resulting mixture, then applied to a hardened floor finish atop a floor and allowed to soften or dissolve the floor finish so that the finish may be removed from the floor.

27 Claims, No Drawings

STRIPPING FLOOR FINISHES USING COMPOSITION THAT THICKENS FOLLOWING DILUTION WITH WATER

CROSS-REFERENCE TO RELATED APPLICATION

This application is a continuation-in-part of and claims priority to pending U.S. patent application Ser. No. 11/107,307 filed Apr. 15, 2005, the disclosure of which is incorporated by reference in its entirety.

TECHNICAL FIELD

This invention relates to floor stripping, to the non-destructive removal of floor finishes and to floor finish stripper compositions.

BACKGROUND

Floor strippers may be used to remove worn or discolored floor finishes from flooring substrates (e.g., vinyl composition tiles) without harming the flooring substrate itself, so that a new finish may be applied. References relating to floor strippers include U.S. Pat. Nos. 5,158,710 (VanEenam '710), 5,419,848 (VanEenam '848), 5,585,341 (VanEenam '341), 5,637,559 (Koreltz et al.), 5,849,682 (VanEenam '682), 6,010,995 (VanEenam '995), 6,544,942 B1 (Smith et al.) and U.S. Pat. No. 6,583,101 B1 (Wiseth et al.).

SUMMARY OF THE INVENTION

Floor strippers are typically sold as concentrates intended to be diluted with water just prior to use, e.g., by mixing the concentrate with water in a mop bucket. The resulting diluted stripper typically has a viscosity less than about 50 cps. Some strippers "dewet" (appear to bead up or otherwise insufficiently wet) on a floor shortly after being applied, and may continue to dewet until the user swabs the stripper back and forth a few times as the floor finish softens. Additionally, the effectiveness of some formulations decreases during application as the solvents evaporate and as the stripper flows into undesired areas.

Some paint strippers are sold in thickened form. Paint strippers typically are used at full strength and are not provided as concentrates intended to be diluted with water or other liquids prior to use. Water is used to remove some paint strippers from softened paint layers after the paint stripper has been applied to the paint.

Less work during stripper application might be required if the stripper had a reduced tendency to dewet when first applied, a reduced tendency to evaporate during use, or a reduced tendency to flow into undesired areas (e.g., carpeting, flooring not being stripped, or areas under store displays and shelving). Stripper effectiveness over non-level or high spots might also be improved if the stripper had a reduced tendency to flow toward low spots within the area to be stripped. The flow characteristics of the stripper can be modified by including a thickener in the concentrate, but it can be difficult to dispense thickened concentrates from a container.

The present invention provides, in one aspect, a method for stripping a floor comprising:

a) providing a substantially nonchlorinated concentrate comprising a floor finish dissolver and an at least partially water-unactivated water thickener;

b) diluting the concentrate with water at an intended use location to activate the water thickener and noticeably increase within sixty minutes or less the viscosity of the resulting diluted mixture;

c) applying the resulting water-thickened stripper to a hardened floor finish atop a floor;

d) allowing the applied stripper to soften or dissolve the floor finish; and e) removing the softened or dissolved finish from the floor.

The present invention provides, in another aspect, a water-thickenable floor finish stripper concentrate composition comprising a floor finish dissolver, an at least partially water-unactivated water thickener and a metal ion-containing compound, wherein when the concentrate is diluted with at least an equal volume of water the viscosity of the resulting diluted mixture noticeably increases within sixty minutes or less, and wherein the metal ion-containing compound can interact with the water thickener to lower the viscosity of the concentrate without appreciably reducing the increase in the diluted mixture viscosity.

The disclosed method and disclosed water-thickenable strippers can provide more effective stripping than might be obtained using unthickened strippers. The disclosed water-thickenable strippers can also be more convenient to dispense and use than stripper concentrates that have already been significantly thickened prior to dilution.

DETAILED DESCRIPTION

The phrase "hardened floor finish" refers to an applied liquid coating that through a chemical or physical process (including solvent evaporation or other drying processes, photochemical reactions, electrochemical reactions, radical processes, thermal processes, ionic processes, moisture cure processes or multiple-component (e.g., two- or three-component) crosslinking processes) has become dried, crosslinked or otherwise cured in situ to form a tack-free film on a floor. The phrase "floor finish dissolver" refers to an organic or inorganic liquid or solid material that can dissolve, soften, uncrosslink, depolymerize or otherwise assist in removing a hardened floor finish from a floor.

The phrase "stripping a floor" refers to removing, at such time as it may be desired to do so, a hardened floor finish from an underlying installed flooring substrate without removing substantial portions of the flooring substrate. Such removal may employ minimally abrasive measures such as application of the disclosed stripper followed by rinsing using, e.g., water or a detergent solution, and may if desired be accompanied by more abrasive but flooring-safe measures such as use of a nonwoven floor scrub pad, but can be carried out without requiring a flooring-damaging removal step such as sanding.

The word "concentrate" refers to a composition intended to be diluted with water before use. The phrase "substantially nonchlorinated" refers to a concentrate that does not contain objectionable quantities of chlorinated solvents (e.g., methylene chloride) whose presence could pose a health hazard to users. The phrase "diluting the concentrate with water" refers to mixing a concentrate with water (e.g., plain tap water) in an amount sufficient to at least double the volume of the resulting mixture. The phrase "diluting the concentrate merely with water" refers to mixing a concentrate with water and substantially no other required ingredients in an amount sufficient to at least double the volume of the resulting mixture. The phrase "at an intended use location" refers to carrying out such diluting at or near (e.g., in the same building as) a floor to be stripped.

The phrase "at least partially water-unactivated water thickener" refers to a material that will build the viscosity of a diluted mixture of the concentrate and water shortly after the concentrate and water are rapidly mixed. Such viscosity building may be due to a variety of mechanisms, e.g., a change in one or more factors such as the water thickener's extent of hydration, association, neutralization or crosslinking, or by a change in the water thickener's molecular configuration. For example the water thickener may change from an unhydrated or only partially hydrated state to a fully hydrated state when the concentrate is diluted with water. The phrase "fully water activated water thickener" refers to a material that may thicken a concentrate or a diluted mixture of the concentrate and water, but which will not significantly build the viscosity of a diluted mixture of the concentrate and water after the concentrate and water are mixed.

The disclosed concentrates may have a variety of physical forms including liquids, gels, pastes and solids. Suitable solids include powders and monolithic shapes such as molded, extruded and otherwise formed shapes. If a liquid or gel, the concentrate may be a solution, dispersion or emulsion, and desirably is clear or translucent. If a liquid, gel or paste, the concentrate desirably is homogenous (e.g., a single phase solution or a stable emulsion or dispersion) and remains so when stored. If not homogeneous and storage stable, the concentrate desirably remains homogenous for at least long enough (e.g., 1 minute or more, 5 minutes or more or 10 minutes or more) after the concentrate has been shaken or stirred to disperse or redisperse the thickener so that the concentrate can readily be diluted with water. Homogeneity is not required and if need be the concentrate may be non-homogeneous. Prior to dilution, the concentrate may have a viscosity greater than or less than that of the diluted use-solution. After dilution, the diluted use-solution will exhibit viscosity building (viz., an increase viscosity shortly after mixing), and typically will reach a built (e.g., a plateau) viscosity greater than that of water and desirably greater than that of the concentrate. The built viscosity value desirably will persist at least long enough to accomplish floor stripping (e.g., 10 minute or more, 20 minutes or more or 30 minutes or more). The diluted use-solution desirably is homogeneous and remains so if stored. If not homogeneous and storage stable, the diluted use-solution desirably remains homogenous for at least long enough to accomplish floor stripping. Desirably the diluted use-solution will also exhibit shear-thinning. Such shear thinning can provide an auto-arresting feature that lets a user throw the diluted use-solution onto a floor (e.g., by casting it from a mop bucket), whereupon the use-solution will rapidly spread out and then "freeze" in place. Shear-thinning may be imparted to the diluted use-solution in a variety of ways, such as by employing an appropriate water thickener or separate thixotropic agent that imparts shear-thinning properties to the diluted use-solution.

A variety of floor finish dissolvers may be employed in the disclosed stripping method. Representative floor finish dissolvers include solvents such as alcohols (e.g., cyclic alcohols), amines, amides, ethers (e.g., hydroxyethers), ketones, dialkyl carbonates, essential oils, esters (e.g., cyclic esters, dibasic esters and phthalate esters), oxygenated solvents (e.g., glycol ethers) and mixtures thereof. Some materials may serve as a solvent in some concentrates or in some floor stripping applications, and as a cosolvent in combination with one or more floor finish dissolvers in other concentrates or in other floor stripping applications. Such cosolvents may for example assist in dissolving or dispersing a floor finish dissolver in a concentrate, help maintain the concentrate in a desirable physical state during storage, ease dilution of the concentrate with water, reduce cost, reduce odor or provide some other desirable packaging, storage or use benefit. Representative floor finish dissolvers also include caustic materials (e.g., solid caustic materials).

Representative solvents include acetamidophenol, acetanilide, acetophenone, 2-acetyl-1-methylpyrrole, benzyl acetate, benzyl alcohol, benzyl benzoate, benzyloxyethanol, ethylene glycol phenyl ether (commercially available as "DOWANOL™ EPh" from Dow Chemical Co.), propylene glycol phenyl ether (commercially available as "DOWANOL PPh" from Dow Chemical Co.), 2-(2-aminoethoxy)ethanol, monoethanolamine, diethanolamine, triethanolamine, water-soluble or water-dispersible polymeric amines such as poly(ethylene imine), amyl acetate, amyl alcohol, butanol, 3-butoxyethyl-2-propanol, butyl acetate, n-butyl propionate, cyclohexanone, diacetone alcohol, diethoxyethanol, diethylene glycol methyl ether, diisobutyl carbinol, diisobutyl ketone, dimethyl heptanol, dipropylene glycol tert-butyl ether, ethanol, ethyl acetate, 2-ethylhexanol, ethyl propionate, ethylene glycol, ethylene glycol methyl ether acetate, glycerin, hexanol, isobutanol, isobutyl acetate, isobutyl heptyl ketone, isophorone, isopropanol, isopropyl acetate, methanol, methyl amyl alcohol, methyl n-amyl ketone, 2-methyl-1-butanol, methyl ethyl ketone, methyl isobutyl ketone, 1-pentanol, n-pentyl propionate, 1-propanol, n-propyl acetate, n-propyl propionate, propylene glycol, propylene glycol ethyl ether, tripropylene glycol methyl ether (commercially available as DOWANOL TPM from Dow Chemical Co.), tripropylene glycol n-butyl ether (commercially available as DOWANOL TPNB from Dow Chemical Co.), diethylene glycol n-butyl ether acetate (commercially available as Butyl CARBITOL™ acetate from Dow Chemical Co.), diethylene glycol monobutyl ether (commercially available as Butyl CARBITOL from Dow Chemical Co.), ethylene glycol n-butyl ether acetate (commercially available as Butyl CELLOSOLVE™ Acetate from Dow Chemical Co.), ethylene glycol monobutyl ether (commercially available as Butyl CELLOSOLVE from Dow Chemical Co.), dipropylene glycol monobutyl ether (commercially available as Butyl DIPROPASOL™ from Dow Chemical Co.), propylene glycol monobutyl ether (commercially available as Butyl PROPASOL from Dow Chemical Co.), ethyl 3-ethoxypropionate (commercially available as UCAR™ Ester EEP from Dow Chemical Co.), 2,2,4-trimethyl-1,3-pentanediol monoisobutyrate (commercially available as UCAR FILMER™ IBT from Dow Chemical Co.), diethylene glycol monohexyl ether (commercially available as Hexyl CARBITOL from Dow Chemical Co.), ethylene glycol monohexyl ether (commercially available as Hexyl CELLOSOLVE from Dow Chemical Co.), diethylene glycol monomethyl ether (commercially available as Methyl CARBITOL from Dow Chemical Co.), diethylene glycol monoethyl ether (commercially available as CARBITOL from Dow Chemical Co.), ethylene glycol methyl ether acetate (commercially available as Methyl CELLOSOLVE acetate from Dow Chemical Co.), ethylene glycol monomethyl ether (commercially available as Methyl CELLOSOLVE from Dow Chemical Co.), dipropylene glycol monomethyl ether (commercially available as Methyl DIPROPASOL from Dow Chemical Co.), propylene glycol methyl ether acetate (commercially available as Methyl PROPASOL™ acetate from Dow Chemical Co.), propylene glycol monomethyl ether (commercially available as Methyl PROPASOL from Dow Chemical Co.), diethylene glycol monopropyl ether (commercially available as Propyl CARBITOL from Dow Chemical Co.), ethylene glycol monopropyl ether (commercially available as Propyl CELLOSOLVE from Dow Chemical Co.), dipropylene glycol monopropyl ether (commercially available as Propyl DIPROPASOL from Dow Chemical Co.) and propylene glycol monopropyl ether (commercially available as Propyl PROPASOL from Dow Chemical Co.). Representative dialkyl carbonates include dimethyl carbonate, diethyl carbonate, dipropyl carbonate, diisopropyl carbonate and dibutyl carbonate. Representative essential oils include benzaldehyde, pinenes (alphas, betas, etc.), terpineols, terpinenes, carvone, cinnamealdehyde, borneol and its esters, citrals, ionenes, jasmine oil, limonene, dipentene, linalool and its esters. Representative dibasic esters include dimethyl adipate, dimethyl succinate, dimethyl glutarate, dimethyl malonate, diethyl adipate, diethyl succinate, diethyl glutarate, dibutyl succinate, dibutyl glutarate and products available under the trade designations DBE™, DBE-3, DBE-4, DBE-5, DBE-6, DBE-9, DBE-IB, and DBE-ME from DuPont Nylon. Representative phthalate esters include dibutyl phthalate, diethylhexyl phthalate and diethyl phthalate. Representative caustic floor finish dissolvers include sodium metasilicate pentahydrate, sodium hydroxide and potassium hydroxide, and mixtures thereof. Preferred floor finish dissolvers include benzyl alcohol, dibasic esters, essential oils, dialkyl carbonates, ethylene glycol monobutyl ether, diethylene glycol monobutyl ether, ethylene glycol phenyl ether, ethylene glycol monohexyl ether, propylene glycol phenyl ether, ethanolamines, caustics, and mixtures thereof. The floor finish dissolver(s) (including cosolvent(s), if employed), may collectively represent for example at least 20%, at least 30%, at least 40%, at least 50%, at least 60%, at least 70%, at least 80%, at least 90% or at least 95% of the total concentrate weight.

A variety of water thickeners may be employed in the disclosed concentrate and stripping method. Representative water thickeners include gums and other polysaccharides such as carrageenan, cassia gum, diutan gum, gellan gum, guar gum, Gum Arabic, Gum Tragacanth, locust bean gum, whelan gum and Xanthan gum; alginates such as agar; cellulose ethers such as ethyl cellulose, hydroxyethyl cellulose, ethyl hydroxyethyl cellulose, methyl cellulose, hydroxypropyl cellulose, hydroxypropyl methyl cellulose, and other alkyl or hydroxyalkyl cellulose ethers; acrylic acid copolymers; polyethylene oxides (e.g., high molecular weight polyethylene oxides) such as polyethylene glycols and methoxypolyethylene glycols; polyvinyl alcohols; polyvinyl pyrrolidone; starches; polyurethanes; methyl vinyl ether/maleic anhydride copolymers; and mixtures thereof. The water thickeners also may include hydrophobe-modified ethoxy urethane (HEUR) thickeners, hydrophobe-modified alkali soluble emulsion (HASE) thickeners, hydrophobe-modified hydroxyethyl cellulose (HM-HEC) thickeners, and HEUR-ASE combination thickeners. Representative commercially available water thickeners include Xanthan gums such as KELZAN™, KELZAN AR, KELZAN ASX, KELZAN ASX T, KELZAN CC, KELZAN HP, KELZAN RD, KELZAN S, KELZAN ST, KELZAN T, KELTROL™, KELTROL T and KELTROL TF (all from CP Kelco) and VANZAN™ and VANZAN D (both from R.T. Vanderbilt Co.); diutan gums such as GEOVIS™ XT, KELCO-CRETE™ 80, KELCO-CRETE 200 and KOC617 (all from CP Kelco); gellan gums such as KELCOGEL™, KELCOGEL F and KELCOGEL LT 100 (all from CP Kelco); carrageenan gums such as GENU-VISCO™ X-906-02 (from CP Kelco), hydrocolloids such as NOVEGUM™ C865, NOVEGUM C866 and NOVEGUM G888 (all from Noveon, Inc.); natural or synthetic clays including bentonite, hectorite, smectite and other silicates such as available grades of BENTOLITE™, CLAYTONE™ and GELWHITE™ bentonites, PERMON™ smectites, CLOISITE™ magnesium aluminum silicates, LAPONITE™ silicates and GARAMITE™ silicates (all available from Southern Clay Products, Inc.) and available grades of OPTIGEL™ bentonites, hectorites, smectites and other clays (all from Süd-Chemie Group); homopolymers or copolymers of acrylic acid, e.g., those which may be neutralized with a salt including associative or non-associative thickeners such as ACUSOL™ 801s, ACUSOL 810, ACUSOL 810A, ACUSOL 820, ACUSOL 823 and ACUSOL 830 acrylate polymers (all from Rohm & Haas Co.) or those which may be crosslinked (e.g., with a polyalkenyl polyether) including CARBOPOL™ 674, CARBOPOL 676, CARBOPOL ETD 2691, CARBOPOL ETD 2623, CARBOPOL EZ-3, CARBOPOL EZ-3A, CARBOPOL EZ-4 and CARBOPOL ULTREZ™ 21 (all from Noveon, Inc.); PEMULEN™ 1622 copolymer (from Noveon, Inc.); cellulose ethers such as METHOCEL™ K15MDGSE, METHOCEL K4MDGSE, METHOCEL 311, METHOCEL F4M PRG and METHOCEL OS (all from Dow Chemical Company) and XDS 8898.5 cellulose ether (from Dow Chemical Company); hydroxypropyl cellulose ethers such as KLUCEL™ H, KLUCEL M or KLUCEL G (all from Hercules Inc.), polyurethane polymers including RHEOLATE™ 266 (from Elementis Specialties, Inc.), and available grades of OPTIFLO™ associative thickeners (all available from Sud-Chemie Group). The amount of water thickener may vary depending on factors such as the chosen floor finish dissolver, the possible presence of water in the concentrate (which may result in partial activation of the water thickener before dilution at the intended use location), the desired dilution level, the desired viscosity build rate following mixing, and the desired degree of thickening for the given intended use. As a general guide, the amount of water thickener expressed as solids may for example be about 0.1 to about 30%, about 2 to about 20% or about 3 to about 10% of the total concentrate weight.

The concentrate may also contain antisettling agents that may help discourage settling or sedimentation of the water thickener before the concentrate is diluted with water. Desirably the concentrate is. homogeneous (e.g., non-settling) even if heated or cooled to temperatures to which the concentrate might be exposed during shipment or storage. Representative antisettling agents include many of the water thickening agents listed above (e.g., natural or synthetic clays, and some acrylate polymers) as well as materials that discourage such settling or sedimentation but which do not serve as water thickeners.

The concentrate may and desirably will contain one or more surfactants. Representative surfactants will be familiar to those skilled in the art, and include water-soluble and oil-soluble anionic, cationic, amphoteric and nonionic surfactants, and mixtures thereof. Some nonionic surfactants can interact with acrylate polymer water thickeners to provide a reduced viscosity concentrate, to increase the viscosity of the diluted use solution, or both. Other surfactants may interact with the water thickener to cause an appreciable increase in the concentrate viscosity, and thus may be less desirable. Especially desirable surfactants include those that improve wetting properties of the diluted use solution, improve stability of the concentrate, or provide other desirable properties such as storage, mixing, application or stripping advantages.

Exemplary anionic surfactants include alkylbenzene sulfonates (e.g., C6-C24 alkylbenzene sulfonates), olefin sulfonates (e.g., C6-C24 olefin sulfonates), paraffin sulfonates (e.g., C6-C24 paraffin sulfonates), cumene sulfonate, xylene sulfonate, alcohol sulfates (e.g., C6-C24 or C6-C12 alcohol sulfates), alcohol ether sulfates having 1 to about 20 ethylene oxide groups, and mixtures thereof.

Exemplary cationic surfactants include quaternary amine compounds having the formula:

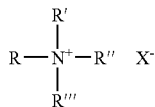

where R, R', R" and R'" are each an alkyl, aryl or aralkyl group (e.g., a $C_6$-$C_{24}$ alkyl, aryl or aralkyl group) which can optionally contain one or more P, O, S or N heteroatoms, and X is F, Cl, Br, I or an alkyl sulfate.

Exemplary amphoteric surfactants include amine oxide compounds having the formula:

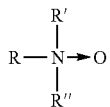

where R, R' and R" are as defined above, and mixtures thereof.

Exemplary amphoteric surfactants also include betaine compounds having the formula:

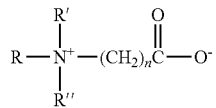

where R, R' and R" are as defined above and n is about 1 to about 10, and mixtures thereof.

Exemplary nonionic surfactants include alcohol ethoxylates (e.g., $C_6$-$C_{24}$ or $C_6$-$C_{16}$ alcohol ethoxylates) having 1 to about 20 ethylene oxide groups (e.g., about 9 to about 20 ethylene oxide groups), alkylphenol ethoxylates (e.g., $C_6$-$C_{24}$ or $C_8$-$C_{10}$ alkylphenol ethoxylates) having 1 to about 100 ethylene oxide groups (e.g., about 12 to about 20 ethylene oxide groups), alkylpolyglycosides (e.g., $C_6$-$C_{24}$ or $C_6$-$C_{20}$ alkylpolyglycosides) having 1 to about 20 glycoside groups (e.g., about 9 to about 20 glycoside groups), and mixtures thereof.

The amount of surfactant may vary depending on factors such as the chosen floor finish dissolver, the possible presence of water in the concentrate, the desired dilution level, the desired thickening rate following mixing, the desired degree of thickening for the given intended use, and interactions between the surfactant and the water thickener. As a general guide, the amount of surfactant may be about 0.1 to about 50%, about 0.1 to about 15% or about 2 to about 15% of the total concentrate weight.

The concentrate may and desirably will contain one or more sources of metal ion-containing compounds. Representative metal ion-containing compounds include acids, bases and salts (including metal complex salts). Desirable metal ion-containing compounds include those which can interact with the water thickener to lower the viscosity of the concentrate without appreciably reducing the diluted use-solution built viscosity value. For example, ions of alkali metals such as potassium can interact with acrylate polymer water thickeners to provide a reduced viscosity concentrate without significantly impacting the use dilution viscosity.

The concentrate may contain one or more binders that solidify the concentrate and enable it to be granulated into a powder or made into a molded, extruded or other formed shape. Suitable binders include carbonates (e.g., sodium carbonate), urea, silicates (e.g., sodium metasilicate), tripolyphosphates, and mixtures thereof. Some solid caustic materials such as sodium metasilicate pentahydrate may serve both as a floor finish dissolver and as a binder.

The concentrate may contain one or more chelating agents that can counteract the sensitivity of some thickeners to water hardness. Without such chelating agents, a concentrate designed to be diluted using softened water might perform differently if diluted using unsoftened water. Water hardness may also vary considerably from use site to use site. The addition of an appropriate chelating agent to the thickened stripper concentrate can address this potential problem. As a general guide, the amount of chelating agent may be about 0.01 to about 5% or about 0.1 to about 1% of the total concentrate weight.

The concentrate may contain other adjuvants including biocides, abrasive particles, builders, defoamers, fragrances, dyes, indicators, colorants, pH adjusters, anticorrosion additives, antirust additives, light stabilizers, humectants and antioxidants. The types and amounts of such adjuvants may readily be determined by those skilled in the art. The concentrate may also contain a limited amount of water, provided that the amount is such that the water thickener is partially but not fully activated and can become fully activated following dilution of the concentrate with water at an intended use location. The water amount desirably is less than 50% and may be for example less than 30%, less than 20%, less than 10%, less than 5% or less than 1% of the total concentrate weight.

The concentrate may be manufactured by merely mixing the ingredients. The concentrate may also be manufactured by adding the water thickener and other desired ingredients to a commercial stripper (which may be modified as needed to remove some or all of any water that may be present so as to avoid fully activating the water thickener) such as BRIGHT BLAST™, HAWK™, FREEDOM™ and CARE STRIP LOW ODOR™ stripper concentrates from Ecolab Inc.; JUGGERNAUT™ stripper concentrate from Buckeye International, Inc.; PROSTRIP™ and FASTRIP™ stripper concentrates from Johnson-Diversey; SHATTERED 99 stripper concentrate from The Brulin Corp.; EXTREME™ and EXTREME ULTRA stripper concentrates from Betco Corp.; and TWIST AND FILL™ stripper concentrate from 3M.

The concentrate may be packaged in any convenient form including bottles, pouches (e.g., rupturable, tearable or dissolvable pouches), drums, dispensers intended to be carried by a user during stripper application and dispensers intended to be replaceably installed in a mixing or dispensing device (e.g., a wall-mounted, freestanding or benchtop dispensing station). Such packaging may include multiple containers, e.g., a first container containing primarily the floor finish dissolver and a second container containing at least partially water-unactivated water thickener with the contents of the containers being mixed together at the intended use location. In another embodiment, such packaging may include a first container containing water and other desired ingredients, a second container containing at least partially water-unactivated water thickener and a third container containing the floor finish dissolver with the contents of the three containers being added to one another and mixed together at the intended use location. In yet another embodiment the at least partially water-unactivated water thickener may be packaged in a pouch or other suitable container and added to a conventional floor stripper at the intended use location. The types and design of suitable packaging will be familiar to those skilled in the art.

A variety of flooring substrates may be stripped using the disclosed method. Exemplary flooring substrates include resilient flooring substrates such as vinyl composition tiles, vinyl sheet flooring, linoleum, rubber sheeting, rubber tile, cork, synthetic sports flooring and vinyl asbestos tile, and non-resilient flooring substrates such as terrazzo, concrete, wood flooring, bamboo, wood laminate, engineered wood products (e.g. wood epoxy blends, permanently coated substrates such as those available under the names PERGO™ and PARQUET™), stone, marble, slate, ceramic tile, grout, and dry shake flooring. The coatings can be applied at a variety of jobsites, including indoor and outdoor sites involving new or existing residential, commercial and government- or agency-owned sites.

A variety of floor finishes may be stripped using the disclosed method. Representative commercially available floor finishes include PADLOCK™, GEMSTAR LASER™, GEMSTAR POLARIS™, GEMSTAR STRATUS™, RIVET™, and TAJ MAHAL™ acrylic floor finishes, GLOSSTEK 100™ and ORION™ polyurethane floor finishes, and COURTMASTER II™, ISI STAR™, TUKLAR MEDICAL™ floor finishes, all from Ecolab Inc.; CORNERSTONE™ and TOPLINE™ acrylic floor finishes from 3M; BETCO BEST™ floor finish from Betco Corp.; HIGH NOON™ acrylic finish from Butchers; CITATION™ and CASTLEGUARD™ acrylic finishes from Buckeye International, Inc., COMPLETE™, SIGNATURE™, TECHNIQUE™ and VECTRA™ acrylic floor finishes from SC Johnson Professional Products; OVER AND UNDER™ floor sealer from S.C. Johnson Professional Products; SPLENDOR™, DECADE 90™, PRIME SHINE™ ULTRA and PREMIER™ acrylic finishes and FIRST ROUND and FORTRESS™ urethane acrylic finishes from Minuteman, International, Inc.; ACRYL-KOTE™ Seal and Finish and PREP Floor Seal from Minuteman, International, Inc.; ULTRA TC™ and UV I-FINISH™ UV-curable finishes from Minuteman, International, Inc; FLOORSTAR™ Premium 25 floor finish from ServiceMaster, Inc.; and UPPER LIMITS™ acrylic finish and ISHINE™ optically brightened floor finish from Spartan Chemical Co. Other suitable floor finishes may be based on film formers including No. AD200C1 polyester polyurethane formulation from Air Products and Chemicals, Inc.; LAROMER™ PE 22 WN polyester acrylate emulsion, LAROMER LR 8949 aqueous radiation curable aliphatic polyurethane dispersion and LAROMER LR 8983 aqueous radiation curable aromatic polyurethane dispersion, all from BASF Corp.; No. MG98-040 polyester polyurethane formulation from Bayer AG; MEGATRAN™ 205 zinc crosslinked acrylic dispersion and SYNTRAN™ 1580 zinc crosslinked acrylic dispersion from Interpolymer Corp.; MORGLO™ zinc crosslinked acrylic dispersion and MORGLO2™ acrylic styrene polymer emulsion, both from Omnova Solutions Inc.; STAY-CLAD™ 5900 hydroxyl-functional acrylic polymer dispersion from Reichhold, Inc.; DURAPLUS™ 2 modified acrylic low odor mixed-metal crosslinked polymer, DURAPLUS 3 zinc crosslinked acrylic dispersion, DURAGREEN™ MF1 metal free acrylic polymer emulsion, PRIMAL™ B-336AFK modified acrylic zinc crosslinked polymer, PRIMAL B-924ER zinc crosslinked, all acrylic polymer emulsion, PRIMAL E-2483 metal crosslinked acrylic polymer, PRIMAL E-3188 waterborne acrylic polymer dispersion, PRIMAL NT-2624 metal-free polymer, PRIMAL NT-6035 metal-free polymer, RHOPLEX™ B-924 all-acrylic metal-crosslinked floor polish polymer, RHOPLEX 1421 zinc crosslinked acrylic dispersion, RHOPLEX B-1604 metal-crosslinked modified acrylic polymer, RHOPLEX NT-2624 metal crosslinker-free modified acrylic polish, RHOPLEX 3479 low foaming metal-crosslinked modified acrylic polymer, ROSHIELD™ 3120 UV curable acrylate coating and UHS Plus™ metal-crosslinked modified acrylic polymer, all from Rohm & Haas Co.; VIAKTIN™ VTE 6155 aliphatic urethane acrylate, VTE 6165 aromatic urethane acrylate and VTE 6169 aliphatic polyester urethane radiation curing resins, all from Solutia, Inc.; Nos. 979-1 and 980-3 polyester polyurethane formulations from U.S. Polymers, Inc.; the ZVOC™ series of UV curable coatings from UV Coatings Limited; No. G-2029 acrylic polyurethane formulation and NEORAD™ NR-3709 UV curable aliphatic urethane coating from Zeneca Resins; 98-283W urethane acrylate from Hans Rahn & Co.; and materials such as those described in U.S. Pat. Nos. 4,517,330, 4,999,216, 5,091,211, 5,319,018, 5,453,451, 5,773,487, 5,830,937, 6,096,383, 6,197,844, 6,228,433. 6,316,535 B1, 6,544,942 B1, U.S. Patent Application Publication No. US2002/0028621 A1, and in the patents cited therein. The floor finishes may include water-soluble or water-dispersible film formers such as metal-free acrylic finishes, acid-containing polymers crosslinked using transition metals, and water-soluble or water-dispersible multicomponent (e.g., two component) polyurethanes. The floor finish may contain mixtures of film formers.

The concentrate may be diluted with water or with a water-based diluent that mostly contains water (e.g., a mixture of a major amount of water and a minor amount of an alcohol) at the intended use location. The water may for example be ordinary tap water, softened water or process water. The concentrate:diluent dilution ratio may be for example be at least 1:1 by volume, at least 1:2, at least 1:3, at least 1:4, at least 1:5, at least 1:6, at least 1:8, at least 1:10 or more. A variety of mixing methods may be employed. Mixing in a mop bucket is one such method and may be preferred. The diluted use mixture may be stirred as needed and if desired allowed to stand for a time sufficient to activate the water thickener and noticeably increase the mixture viscosity. A noticeable (e.g., subjectively determinable based on stripping performance) viscosity increase may take place within sixty minutes or less, e.g., beginning 15 seconds, 30 seconds or one minute after the start of mixing, and may build within for example 45 minutes, 30 minutes, 15 minutes, 10 minutes, 5 minutes or 2 minutes after the start of mixing. These recited times do not preclude the possibility that further viscosity building may continue to take place thereafter. The built viscosity 15 minutes after the concentrate and diluent are mixed may for example be more than 100 cps, more than 200 cps or more than 300 cps as measured at room temperature using a Brookfield viscometer and an HA No. 6 spindle operated at 20 rpm, and the viscosity increase compared to the viscosity measured as soon as possible after the concentrate and diluent are mixed may for example at least 50 cps, at least 100 cps or at least 200 cps.

The hardened floor finish can optionally be abraded with a suitably mild abrasive (e.g., a green or black SCOTCH-BRITE™ Floor Maintenance pad from 3M) prior to applying the thickened stripper. The thickened stripper may be applied using techniques that will be familiar to those skilled in the art (e.g., using a flat or string mop, squeegee, roller or towel). The applied stripper should be allowed to stand for a suitable time (e.g., for a minute or more, and typically between about 5 and about 20 minutes) while it softens or dissolves the floor finish. The softened or dissolved finish may be removed using a variety of techniques that will be familiar to those skilled in the art including vacuuming, mopping, scrubbing or wiping. The stripped floor may be optionally rinsed with water and allowed to dry and a new layer or layers of floor finish applied and caused or allowed to harden.

The invention is further illustrated in the following non-limiting examples, in which all parts and percentages are by weight unless otherwise indicated.

EXAMPLE 1

A concentrate was prepared by mixing 98% benzyl alcohol and 2% VANZAN Xanthan gum (R.T. Vanderbilt Co.). The concentrate was diluted with tap water at a 2:25 concentrate:water ratio, mixed and allowed to stand for several minutes, resulting in formation of a thickened stripper mixture. Using a cotton towel, the thickened stripper was applied to vinyl tile floors coated with three hardened coats of GEMSTAR LASER finish or three hardened coats of ISI STAR finish (both available from Ecolab, Inc.) which had been applied using a 50 $m^2$/L (2000 $ft^2$/gallon) coating rate. The thickened stripper mixture applied easily, and did not appear to dewet. The applied stripper was allowed to stand for 10 minutes, then scrubbed using a "swing machine" style electric floor scrubber equipped with a black nonwoven scrub pad. The softened floor finish was removed using a wet/dry shop vacuum. Both finishes were completely stripped.

EXAMPLE 2

Using the method of Example 1, a concentrate was prepared by mixing 80% benzyl alcohol, 0.5% PEMULEN 1622 copolymer thickener (Noveon, Inc.) and 19.5% monoisopropylamine. This concentrate provided a thickened liquid when diluted at a 1:10 ratio with water.

EXAMPLE 3

An additional noticeably thickened dilution was obtained when the Example 2 concentrate ingredients were changed to a mixture of 99% benzyl alcohol and 1% PEMULEN 1622 polymer or 98% benzyl alcohol and 2% KELZAN AR Xanthan gum (CP Kelco, Inc.).

EXAMPLE 4

Using the method of Example 1, a floor stripper was prepared at an intended use location by mixing benzyl alcohol with Xanthan gum and water to produce a final mixture containing 77.15% water, 21.77% benzyl alcohol and 1.08% Xanthan gum. Using a 15 minute standing time following application, the thickened stripper mixture was used to completely strip a vinyl tile floor coated with five coats of hardened GEMSTAR LASER finish which had been applied using a 50 $m^2$/L (2000 $ft^2$/gallon) coating rate.

EXAMPLE 5

Using the method of Example 1, concentrates were made by mixing either 98% benzyl alcohol of 98% DOWANOL EPh ethylene glycol phenyl ether (Dow Chemical Co.) with 2% of a thickener from Table 1 below. The floor finish dissolvers and thickeners used in the various concentrates are identified as Formulation 5-1 through 5-14 in Table 1.

TABLE 1

| Ingredient (%) | 5-1 | 5-2 | 5-3 | 5-4 | 5-5 | 5-6 | 5-7 | 5-8 | 5-9 | 5-10 | 5-11 | 5-12 | 5-13 | 5-14 |
|---|---|---|---|---|---|---|---|---|---|---|---|---|---|---|
| Benzyl alcohol | 98 | 98 | 98 | 98 | 98 | 98 | 98 | | | | | | | |
| DOWANOL Eph[1] | | | | | | | | 98 | 98 | 98 | 98 | 98 | 98 | 98 |
| KELTROL T Xanthan gum[2] | 2 | | | | | | | 2 | | | | | | |
| KELZAN ASX Xanthan gum, 42 mesh[2] | | 2 | | | | | | | 2 | | | | | |
| KELZAN ASX T Xanthan gum, 42 mesh[2] | | | 2 | | | | | | | 2 | | | | |
| KELCOGEL gellan gum, 42 mesh[2] | | | | 2 | | | | | | | 2 | | | |
| KELZAN T Xanthan gum, 80 mesh[2] | | | | | 2 | | | | | | | 2 | | |
| KOC617 diutan gum, 200 mesh[2] | | | | | | 2 | | | | | | | 2 | |
| VANZAN Xanthan gum[3] | | | | | | | 2 | | | | | | | 2 |

[1]Dow Chemical Co.
[2]CP Kelco.
[3]R.T. Vanderbilt Co.

The concentrates were placed in glass vials and mixed for 4 hours using a paint shaker. The vials were then allowed to stand for 3 hours and examined to evaluate the dispersion uniformity. All the vials exhibited some solid precipitation after the three hour standing time. The particle size of any non-dispersed material and the speed at which the separated material redispersed after mixing was evaluated by inverting the vials and observing the movement of solid precipitates at the bottom of the vials. Formulation 5-6 and Formulation 5-13 made using KOC617 diutan gum appeared to provide the best results in this trial, as these concentrates exhibited a more uniform dispersion with smaller particles left on the container wall and more rapid redispersion than was observed for the other concentrates.

The resulting 14 concentrates were diluted 1:5 with water and mixed for 3-5 minutes. All the formulations thickened following dilution. The resulting gels were visually examined for uniformity. When using benzyl alcohol as the floor finish dissolver, Formulation 5-6 formed the most uniform gel. When using ethylene glycol phenyl ether as the floor finish dissolver, Formulations 5-8, 5-12, 5-13 and 5-14 formed the most uniform gels.

EXAMPLE 6

Using the method of Example 1, a concentrate was prepared by mixing the ingredients shown below in Table 2:

TABLE 2

| Ingredient | Amount, % |
|---|---|
| DOWANOL EPh ethylene glycol phenyl ether[1] | 23.7 |
| N-cyclohexyl-2-pyrrolidone | 23.7 |
| Cumenesulfonic acid | 8.1 |
| Monoethanolamine | 4.4 |
| MONAZOLINE ™ O imidazoline[2] | 0.6 |
| NAXAN AAL naphthalene sulfonates[3] | 18.7 |
| Butyl CARBITOL diethylene glycol monobutyl ether[1] | 18.7 |
| KOC617 Diutan Gum thickener | 2.0 |

[1]Dow Chemical Co.
[2]Uniqema
[3]Rütgers Organics Corp.

The resulting concentrate was diluted with water and used to strip a vinyl tile floor coated with five hardened coats of GEMSTAR LASER finish or five hardened coats of ISI STAR finish which had been applied using a 50 m$^2$/L (2000 ft$^2$/gallon) coating rate.

EXAMPLE 7

Using the method of Example 1, a series of concentrates was prepared by mixing the ingredients shown below in Table 3:

TABLE 3

| Ingredient | Form. 7-1 | Form. 7-2 | Form. 7-3 | Form. 7-4 | Form. 7-5 |
|---|---|---|---|---|---|
| Benzyl alcohol | 88% | 88% | 88% | 73.0% | 85.5% |
| KOC617 diutan gum | 2.0% | 2.0% | 2.0% | 2.0% | 2.0% |
| DYTEK ™ EP 1,3-pentanediamine[1] | 10.0% | | | | |
| Hexamethylene diamine | | 10.0% | | | |
| Methylpentamethylene diamine | | | 10.0% | | |
| Mixture of 1% KLUCEL H hydroxypropyl cellulose ether[2] in benzyl alcohol | | | | 25% | 12.5% |

[1]E.I. duPont de Nemours and Co.
[2]Hercules, Inc.

Formulations 7-1 and 7-3 through 7-5 were diluted with water and used to strip a vinyl tile floor coated with one coat of ORION two-part polyurethane finish or with a laminate finish system employing one coat of PADLOCK finish followed by one coat of ORION finish. The stripper formulations were applied to the finish, allowed to stand for 20 minutes and evaluated to determine the percent finish removed based on the stripper contact area. The laminate finish was more readily stripped, with Formulations 7-1 and 7-5 removing 100% of the laminate finish. Formulations 7-3 and 7-4 removed progressively lower amounts of the laminate finish. The formulations removed some but not all of the non-laminate finish. The respective stripping performances for the non-laminate finish were Formulation 7-5>Formulation 7-1>Formulation 7-4>Formulation 7-3.

EXAMPLE 8

Using the method of Example 1, a series of concentrates was prepared by mixing the ingredients shown below in Table 4:

TABLE 4

| Ingredient | Form. 8-1 | Form. 8-2 | Form. 8-3 | Form. 8-4 |
|---|---|---|---|---|
| DOWANOL EPh ethylene glycol phenyl ether | 23.7% | 23.7% | 23.7% | 23.7% |
| n-Methyl pyrrolidone | 23.7% | | | |
| N-hydroxyethyl pyrrolidone | | 23.7% | | |
| DBE-3 dibasic esters | | | 23.7% | |
| AMP-95 2-amino-2-methyl-1-propanol containing 5% water[1] | | | | 23.7% |
| Cumene sulfonic acid | 8.1% | 8.1% | 8.1% | 8.1% |
| Monoethanolamine | 4.4% | 4.4% | 4.4% | 4.4% |
| MONAZOLINE O oleic imidazoline | 0.60% | 0.60% | 0.60% | 0.60% |
| Butyl CARBITOL diethylene glycol monobutyl ether | 18.7% | 18.7% | 18.7% | 18.7% |
| NAXAN AAL naphthalene sulfonate | 18.7% | 18.7% | 18.7% | 18.7% |
| KOC617 diutan gum | 2.0% | 2.0% | 2.0% | 2.0% |

[1]Angus Chemical Co.

Each concentrate formula was diluted 1:10 with water, allowed to thicken, and applied to a vinyl tile floor coated with five coats of hardened GEMSTAR LASER finish which had been applied using a 50 m$^2$/L (2000 ft$^2$/gallon) coating rate. The stripper formulations were allowed to stand on the floor finish for 10 minutes. In each case the stripper completely removed the finish.

The concentrates were also evaluated to determine the stability of each emulsion against separation and compared to the Example 6 concentrate. The respective emulsion stabilities decreased in the order Formulation 8-2>Formulation 8-1>Example 6>Formulation 8-4>Formulation 8-3.

EXAMPLE 9

Using the method of Example 1, a series of concentrates was prepared by mixing the ingredients shown below in Table 5:

TABLE 5

| Ingredient | Form. 9-1 | Form. 9-2 | Form. 9-3 | Form. 9-4 |
|---|---|---|---|---|
| DOWANOL EPh ethylene glycol phenyl ether | 23.7% | 23.7% | 23.7% | 23.7% |
| DBE dibasic esters[1] | 23.7% | | | |
| DBE-4 dibasic esters[1] | | 23.7% | | |
| DBE-5 dibasic esters[1] | | | 23.7% | |
| DBE-6 dibasic esters[1] | | | | 23.7% |
| Cumene sulfonic acid | 8.1% | 8.1% | 8.1% | 8.1% |
| Monoethanolamine | 4.4% | 4.4% | 4.4% | 4.4% |
| MONAZOLINE O oleic imidazoline | 0.60% | 0.60% | 0.60% | 0.60% |
| Butyl CARBITOL diethylene glycol monobutyl ether | 18.7% | 18.7% | 18.7% | 18.7% |
| NAXAN AAL naphthalene sulfonate | 18.7% | 18.7% | 18.7% | 18.7% |
| KOC617 diutan gum | 2.0% | 2.0% | 2.0% | 2.0% |

[1]DuPont Nylon.

Each concentrate formula was diluted 1:10 with water, allowed to thicken, and applied to a vinyl tile floor coated with five coats of hardened GEMSTAR LASER finish which had been applied using a 50 m$^2$/L (2000 ft$^2$/gallon) coating rate. The stripper formulations were allowed to stand on the floor finish for 10 minutes. In each case the stripper completely removed the finish.

The concentrates were also evaluated to determine the stability of each emulsion against separation. The respective emulsion stabilities decreased in the order Formulation 9-4>Formulation 9-3>Formulation 9-2>Formulation 9-1.

EXAMPLE 10

Using the method of Example 1, concentrates were prepared by mixing the ingredients shown below in Table 6:

TABLE 6

| Ingredient | Form. 10-1 | Form. 10-2 |
|---|---|---|
| DOWANOL EPh ethylene glycol phenyl ether | 23.7% | 23.7% |
| N-hydroxyethyl pyrrolidone | 23.7% | |
| DBE-5 dibasic esters | | 23.7% |
| Cumene sulfonic acid | 8.1% | 8.1% |
| Monoethanolamine | 4.4% | 4.4% |
| MONAZOLINE O oleic imidazoline | 0.60% | 0.60% |
| Butyl CARBITOL diethylene glycol monobutyl ether | 18.7% | 18.7% |
| NAXAN AAL naphthalene sulfonate | 18.7% | 18.7% |
| KOC617 diutan gum | 2.0% | 2.0% |

Each concentrate formula was diluted 1:10 with water, allowed to thicken, and applied to a vinyl tile floor coated with five coats of hardened GEMSTAR LASER finish which had been applied using a 50 m$^2$/L (2000 ft$^2$/gallon) coating rate. The stripper formulations were allowed to stand on the floor finish for 10 minutes. In each case the stripper completely removed the finish. Formulation 10-1 stripped the finish more quickly than Formulation 10-2.

EXAMPLE 11

Using the method of Example 1, a series of concentrates was prepared by mixing the ingredients shown below in Table 7:

TABLE 7

| Ingredient | Form. 11-1 | Form. 11-2 | Form. 11-3 | Form. 11-4 | Form. 11-5 | Form. 11-6 | Form. 11-7 | Form. 11-8 |
|---|---|---|---|---|---|---|---|---|
| DOWANOL EPh ethylene glycol phenyl ether | | | 23.7 g | | 23.7 g | 23.7 g | | 23.7 g |
| N-hydroxyethyl pyrrolidone | | | | 23.7 g | | 23.7 g | 23.7 g | 23.7 g |
| Butyl CARBITOL diethylene glycol monobutyl ether | | 18.7 g | 18.7 g | | | | 18.7 g | 18.7 g |
| Cumene sulfonic acid | 8.1 g | 8.1 g | 8.1 g | 8.1 g | 8.1 g | 8.1 g | 8.1 g | 8.1 g |
| Monoethanolamine | 4.4 g | 4.4 g | 4.4 g | 4.4 g | 4.4 g | 4.4 g | 4.4 g | 4.4 g |
| KOC617 diutan gum | 2.0 g | 2.0 g | 2.0 g | 2.0 g | 2.0 g | 2.0 g | 2.0 g | 2.0 g |

One gram of each Formulation was diluted with water in the amounts shown below in Table 8:

TABLE 8

| Formulation | Weight of Water |
|---|---|
| 11-1 | 75.6 g |
| 11-2 | 32.5 g |
| 11-3 | 18.5 g |
| 11-4 | 28.1 g |
| 11-5 | 28.1 g |
| 11-6 | 16.9 g |
| 11-7 | 18.5 g |
| 11-8 | 12.7 g |

Each of the resulting stripper formulations was allowed to thicken, then applied to a vinyl tile floor coated with five coats of hardened GEMSTAR LASER finish which had been applied using a 50 m$^2$/L (2000 ft$^2$/gallon) coating rate. The stripper formulations were allowed to stand on the floor finish for 10 minutes. Formulations 11-3, 11-5, 11-6 and 11-8 completely removed the finish, and Formulations 11-1, 11-2, 11-4 and 11-7 partially removed the finish.

EXAMPLE 12

Using the method of Example 1, a series of concentrates was prepared by mixing the ingredients shown below in Table 9:

TABLE 9

| Ingredient | Form. 12-1 | Form. 12-2 | Form. 12-3 |
|---|---|---|---|
| DOWANOL EPh ethylene glycol phenyl ether | 23.7 g | 23.7 g | 23.7 g |
| Cumene sulfonic acid | 8.1 g | 8.1 g | 8.1 g |
| Monoethanolamine | 4.4 g | 4.4 g | 4.4 g |
| KOC617 diutan gum | 2.0 g | 2.0 g | 2.0 g |
| MONAZOLINE O oleic imidazoline | 0.6 g | | 0.6 g |
| NAXAN AAL naphthalene sulfonate | | 18.7 g | 18.7 g |

One gram of each Formulation was then diluted with water in the amounts shown below in Table 10:

TABLE 10

| Formulation | Weight of Water |
|---|---|
| 12-1 | 27.6 g |
| 12-2 | 18.5 g |
| 12-3 | 18.3 g |

Each of the resulting stripper formulations was allowed to thicken, then applied to a vinyl tile floor coated with five coats of hardened GEMSTAR LASER finish which had been applied using a 50 m²/L (2000 ft²/gallon) coating rate. The stripper formulations were allowed to stand on the floor finish for 10 minutes. In each case the stripper completely removed the finish.

EXAMPLE 13

Using the method of Example 1, two concentrates were prepared by mixing the ingredients shown below in Table 11:

TABLE 11

| Ingredient | Form. 13-1 | Form. 13-2 |
|---|---|---|
| DOWANOL EPh ethylene glycol phenyl ether | 23.7% | 15.56% |
| N-hydroxyethyl pyrrolidone | 23.7% | 15.56% |
| Cumene sulfonic acid | 8.1% | 10.63% |
| Monoethanolamine | 4.4% | 5.77% |
| MONAZOLINE O oleic imidazoline | 0.60% | 0.79% |
| Butyl CARBITOL diethylene glycol monobutyl ether | 18.7% | 24.54% |
| NAXAN AAL naphthalene sulfonate | 18.7% | 24.54% |
| KOC617 diutan gum | 2.0% | 2.62% |

Formulation 13-1 formed a more stable emulsion than Formulation 13-2.

EXAMPLE 14

Using the method of Example 1, three two-phase concentrates were prepared by mixing the ingredients shown below in Table 12:

TABLE 12

| Ingredient | Form. 14-1 | Form. 14-2 | Form. 14-3 |
|---|---|---|---|
| DOWANOL EPh ethylene glycol phenyl ether | 23.7% | 23.7% | 23.7% |
| N-hydroxyethyl pyrrolidone | 23.7% | 23.7% | 23.7% |
| Cumene sulfonic acid | 8.1% | 8.1% | 8.1% |
| Monoethanolamine | 4.4% | | |
| AMP-95 2-amino-2-methyl-1-propanol containing 5% water | | 4.4% | |
| Diethylethanolamine | | | 4.4% |
| MONAZOLINE O oleic imidazoline | 0.60% | 0.60% | 0.60% |
| Butyl CARBITOL diethylene glycol monobutyl ether | 18.7% | 18.7% | 18.7% |
| NAXAN AAL naphthalene sulfonate | 18.7% | 18.7% | 18.7% |
| KOC617 diutan gum | 2.0% | 2.0% | 2.0% |

EXAMPLE 15

Using the method of Example 14, three additional two-phase concentrates were prepared by mixing the ingredients shown below in Table 13:

TABLE 13

| Ingredient | Form. 15-1 | Form. 15-2 | Form. 15-3 |
|---|---|---|---|
| DOWANOL EPh ethylene glycol phenyl ether | 23.7 g | 23.7 g | 23.7 g |
| Cumene sulfonic acid | 8.1 g | 8.1 g | 8.1 g |
| Monoethanolamine | 4.4 g | 4.4 g | 4.4 g |
| MONAZOLINE O oleic imidazoline | 0.60 g | 0.60 g | 0.60 g |
| KOC617 diutan gum | 2.0 g | 2.0 g | 2.0 g |
| N-hydroxyethyl pyrrolidone | 8 g | 16 g | 23.7 g |
| Butyl CARBITOL diethylene glycol monobutyl ether | 6 g | 12 g | 18.7 g |

EXAMPLE 16

Using the method of Example 1, a series of two-phase concentrates was prepared by mixing the ingredients shown below in Table 14.:

TABLE 14

| Ingredient | Form. 16-1 | Form. 16-2 | Form. 16-3 | Form. 16-4 | Form. 16-5 | Form. 16-6 | Form. 16-7 | Form. 16-8 | Form. 16-9 | Form. 16-10 | Form. 16-11 |
|---|---|---|---|---|---|---|---|---|---|---|---|
| DOWANOL EPh ethylene glycol phenyl ether | 37.9% | 41.2% | 29.2% | 29.4% | 31.3% | 23.9% | 58.8% | 39.9% | 23.9% | 49.6% | 56.9% |
| Cumene sulfonic acid | 13.0% | 14.1% | 10.0% | 10.0% | 10.7% | 8.2% | 10.0% | 13.6% | 8.2% | 16.9% | 19.4% |
| Monoethanolamine | 7.0% | 7.7% | 5.4% | 5.5% | 5.8% | 4.4% | 5.4% | 7.4% | 4.4% | 9.2% | 10.6% |
| KOC617 diutan gum | 3.2% | 3.5% | 2.5% | 2.5% | 2.6% | 2.0% | 2.5% | 3.4% | 2.0% | 2.0% | 2.0% |
| MONAZOLINE O oleic imidazoline | 1.0% | 1.0% | 0.7% | | | | | | | | |
| NAXAN AAL naphthalene sulfonate | | | | 23.2% | 24.7% | 18.8% | 23.2% | 15.8% | 18.8% | 9.8% | 4.9% |
| N-hydroxyethyl pyrrolidone | 37.9% | | 29.2% | 29.4% | | 23.9% | | 19.9% | 11.9% | 12.4% | 6.2% |
| Butyl CARBITOL diethylene glycol monobutyl ether | | 32.5% | 23.0% | | 24.7% | 18.8% | | | 30.7% | | |

EXAMPLE 17

Using the method of Example 1, two concentrates were prepared containing different concentrations of a carrageenan thickener, by mixing the ingredients shown below in Table 15:

TABLE 15

| Ingredient | Form. 17-1 | Form. 17-2 |
|---|---|---|
| DOWANOL EPh ethylene glycol phenyl ether | 39.9% | 35.9% |
| N-hydroxyethyl pyrrolidone | 19.9% | 17.9% |
| Cumene sulfonic acid | 13.6% | 12.2% |
| Monoethanolamine | 7.4% | 6.7% |
| NAXAN AAL naphthalene sulfonate | 15.8% | 14.2% |
| GENUVISCO ™ X-906-02 carrageenan gum[1] | 3.4% | 13.0% |

[1]CP Kelco.

Both formulations were diluted 1:10 with water. Formulation 17-2 thickened following dilution to yield a mixture with a built viscosity of approximately 300 cps as measured about 15 minutes after mixing. At the same dilution, Formulation 17-1 did not appreciably thicken.

EXAMPLE 18

Using the method of Example 1, two concentrates were prepared by mixing the ingredients shown below in Table 16:

TABLE 16

| Ingredient | Form. 18-1 | Form. 18-2 |
|---|---|---|
| DOWANOL EPh ethylene glycol phenyl ether | 49.5% | 50.0% |
| Cumene sulfonic acid | 16.9% | 17.1% |
| Monoethanolamine | 9.1% | 9.1% |
| NAXAN AAL naphthalene sulfonate | 19.5% | 19.6% |
| CELLOSIZE ™ QP3L hydroxyethyl cellulose[1] | 0.80% | 0.80% |
| KELZAN Xanthan gum[2] | 4.2% | 3.4% |

[1]Dow Chemical Co.
[2]CP Kelco.

Both formulations were diluted 1:10 with water and their viscosities were measured using a Brookfield Viscometer and Spindle No. 6 at 50 rpm. The viscosities of both formulations built following dilution to higher values than the undiluted concentrate value. A greater proportional increase was observed for Formulation 18-2 as shown below in Table 17:

TABLE 17

| Formulation | Concentrate Viscosity (cps) | Use-solution Built Viscosity (cps) |
|---|---|---|
| 18-1 | 354 | 412 |
| 18-2 | 152 | 261 |

EXAMPLE 19

Using the method of Example 1, a series of two-phase concentrates was prepared by mixing the ingredients shown below in Table 18:

TABLE 18

| Ingredient | Form. 19-1 | Form. 19-2 | Form. 19-3 | Form. 19-4 |
|---|---|---|---|---|
| DOWANOL EPh ethylene glycol phenyl ether | 46.4% | 50.3% | 48.0% | 43.2% |
| Cumene sulfonic acid | 16.4% | 17.2% | 16.4% | 14.8% |
| Monoethanolamine | 11.5% | 12.4% | 8.7% | 7.8% |
| NAXAN AAL naphthalene sulfonate | 19.7% | 19.7% | 18.8% | 16.9% |
| KELZAN Xanthan gum | | | 3.3% | |
| CARBOPOL ™ EZ3A polymeric thickener[1] | 0.95% | | | |
| CARBOPOL ULTREZ ™ 21 polymeric thickener[1] | | 0.50% | | |
| LAPONITE ™ B hydrous sodium lithium magnesium fluoro-silicate[2] | | | | 17.3% |
| Water | 5.1% | | 4.8% | |

[1]Novion, Inc.
[2]Southern Clay Products.

EXAMPLE 20

Using the method of Example 1, a series of two-phase concentrates was prepared by mixing the ingredients shown below in Table 19:

TABLE 19

| Ingredient | Form. 20-1 | Form. 20-2 | Form. 20-3 |
|---|---|---|---|
| DOWANOL EPh ethylene glycol phenyl ether | 38.7% | 39.5% | 39.5% |
| Cumene sulfonic acid | 13.2% | 13.5% | 13.5% |
| Monoethanolamine | 7.2% | 7.3% | 7.3% |
| NAXAN AAL naphthalene sulfonate | 15.3% | 15.6% | 15.6% |
| N-hydroxyethyl pyrrolidone | 19.3% | 19.7% | 19.7% |
| OPTIGEL ™ WA gellant[1] | 3.3% | | |
| OPTIGEL WM gellant[1] | | 3.4% | |
| OPTIGEL SH gellant[1] | | | 3.4% |
| ETHOQUAD ™ C/25 ethoxylated quaternary ammonium salt[2] | 3.0% | 1.0% | 1.0% |

[1]Sod-Chemie Catalysts Japan, Inc.
[2]Akzo Nobel Surface Chemistry LLC.

EXAMPLE 21 AND COMPARISON EXAMPLES 1-3

Using the method of Example 1, a series of concentrates was prepared using varying amounts of water to partially or fully activate (in this instance, partially or fully hydrate) a diutan gum thickener, by mixing the ingredients shown below in Table 20. The concentrates were diluted with varying amounts of water and the viscosities of the concentrates and diluted use solutions were measured as also shown in Table 20:

TABLE 20

| | Formulation Number | | | | |
|---|---|---|---|---|---|
| Ingredient | 21-1 | 21-2 | Comp. Ex. 1 | Comp. Ex. 2 | Comp. Ex. 3 |
| DOWANOL EPh ethylene glycol phenyl ether | 44.83% | 39.9% | 26.37% | 9.51% | 8.76% |
| Cumene sulfonic acid | 15.28% | 13.5% | 8.99% | 3.24% | 2.98% |
| Monoethanolamine | 8.31% | 7.4% | 4.89% | 1.76% | 1.62% |
| NAXAN AAL naphthalene sulfonate | 17.75% | 15.8% | 10.44% | 3.76% | 3.47% |

TABLE 20-continued

| | Formulation Number | | | | |
|---|---|---|---|---|---|
| Ingredient | 21-1 | 21-2 | Comp. Ex. 1 | Comp. Ex. 2 | Comp. Ex. 3 |
| KOC617 diutan gum | 3.82% | 3.4% | 2.25% | 0.81% | 0.75% |
| Water | 10.0% | 20.0% | 47.05% | 80.92% | 82.42% |
| Total | | | | | |
| Concentrate viscosity: | | | 0 | 2850 | 2000 |
| 1:1.4 Diluted use solution viscosity: | | | | | |
| Immediately after mixing | | | 50 | 750 | 650 |
| At 5 min | | | 50 | 800 | 600 |
| At 10 min | | | 50 | 750 | 650 |
| At 15 min. | | | 50 | 800 | 650 |
| At 30 min. | | | 100 | 750 | 700 |

The viscosity results in Table 20 indicate that the Comparison Example 1-3 formulations did not exhibit viscosity building after the concentrate was mixed with water. The small (viz., ±50 cps) diluted use solution viscosity variations observed from the first to last measurements for each sample appeared to represent normal measurement error rather than viscosity building. Formulation 21-1 and Formulation 21-2 were diluted 1:10 with water and observed to form mixtures whose built viscosities were approximately 352 cps and 371 cps, respectively.

EXAMPLE 22

Using the method of Example 1, two concentrates were prepared by mixing the ingredients shown below in Table 21:

TABLE 21

| Ingredient | Form. 22-1 | Form. 22-2 |
|---|---|---|
| DOWANOL EPh ethylene glycol phenyl ether | 37.16% | 36.41% |
| Cumene sulfonic acid | 12.58% | 12.32% |
| Monoethanolamine | 6.89% | 6.75% |
| NAXAN AAL naphthalene sulfonate | 14.72% | 14.42% |
| Potassium sulfate | 0.5% | 2.0% |
| Water | 25.0% | 25.0% |
| KOC617 diutan gum | 3.12% | 3.06% |

Both of the formulations formed concentrate emulsions that could be diluted to form stripper formulations having a higher viscosity in the diluted state.

EXAMPLE 23

Using the method of Example 1, a series of concentrates was prepared by mixing the ingredients shown below in Table 22:

TABLE 22

| Ingredient | Form. 23-1 | Form. 23-2 | Form. 23-3 | Form. 23-4 |
|---|---|---|---|---|
| DOWANOL EPh ethylene glycol phenyl ether | 35.39% | 31.77% | 33.86% | 35.95% |
| Cumene sulfonic acid | 11.98% | 10.75% | 11.46% | 12.17% |
| Morpholine | | 11.83% | | |
| Urea | | | 17.10% | |
| Monoethanolamine | | | 3.76% | |
| Benzyl ethanolamine | | | | 15.65% |
| Benzylamine | | | | 10.43% |

TABLE 22-continued

| Ingredient | Form. 23-1 | Form. 23-2 | Form. 23-3 | Form. 23-4 |
|---|---|---|---|---|
| NAXAN AAL naphthalene sulfonate | 14.02% | 12.58% | 13.41% | 14.24% |
| Water | 23.81% | 21.37% | 22.78% | 24.19% |
| KOC617 diutan gum | 2.97% | 2.67% | 2.84% | 3.02% |

All four formulations formed concentrate emulsions that could be diluted to form stripper formulations having a higher viscosity in the diluted state.

EXAMPLE 24

Using the method of Example 1, a series of concentrates was prepared by mixing the ingredients shown below in Table 23:

TABLE 23

| | Formulation Number | | | | |
|---|---|---|---|---|---|
| Ingredient | 24-1 | 24-2 | 24-3 | 24-4 | 24-5 |
| DOWANOL EPh ethylene glycol phenyl ether | 49.67% | 47.92% | 47.47% | 43.60% | 40.74% |
| Cumene sulfonic acid | 16.8% | 16.21% | 16.05% | 14.74% | 13.77% |
| Monoethanolamine | 9.22% | 8.90% | 8.81% | 8.09% | 7.56% |
| NAXAN AAL naphthalene sulfonate | 19.66% | 18.97% | 18.79% | 17.26% | 16.13% |
| KOC617 diutan gum | 4.64% | 8.00% | 8.87% | 16.29% | 21.78% |

Formulation 24-1, Formulation 24-2 and Formulation 24-3 were diluted 1:14 with water. Using a 15 minute standing time, Formulation 24-1 and Formulation 24-2 were used to strip a grocery store floor that had been coated with a basecoat of BRIGHTSTAR™ finish (Ecolab, Inc.) and MARKETSTAR™ finish topcoat (Ecolab, Inc.), both of which had been applied using a 50 m2/L (2000 ft2/gallon) coating rate.

The stripping performance of Formulation 24-1 and Formulation 24-2 was also compared side-by-side to that of BRIGHT BLAST™ stripper (Ecolab, Inc.). All three stripper formulations removed 100% of the finish. The performances of Formulation 24-1 and Formulation 24-2 were both significantly better than BRIGHT BLAST in that Formulation 24-1 and Formulation 24-2 both remained where applied, and did not flow under shelving or into areas that were not intended to be stripped. When scrubbed using a swing machine, Formulation 24-1 was observed to flow at most 25-50 mm (1-2 in.), Formulation 24-2 less than 25 mm (less than 1 in.), and BRIGHT BLAST stripper up to 90 cm (up to 3 ft.) outside the machine path.

EXAMPLE 25 AND COMPARISON EXAMPLE 4

Using the method of Example 1, a concentrate was compared to a conventional stripper formula, each made by mixing the ingredients shown below in Table 24:

TABLE 24

| Ingredient | Comp. Ex. 4 | Example 25 |
|---|---|---|
| Water | 52.9% | |
| DOWANOL EPh ethylene glycol phenyl ether | 11.4% | 23.7% |
| N-cyclohexyl-2-pyrrolidone | 11.4% | 23.7% |

TABLE 24-continued

| Ingredient | Comp. Ex. 4 | Example 25 |
|---|---|---|
| Cumene sulfonic acid | 3.9% | 8.1% |
| Monoethanolamine | 2.1% | 4.4% |
| MONAZOLINE O oleic imidazoline | 0.3% | 0.6% |
| NAXAN AAL naphthalene sulfonate | 9.0% | 18.7% |
| Butyl CARBITOL diethylene glycol monobutyl ether | 9.0% | 18.7% |
| KOC617 diutan gum | | 2.05% |

The Example 25 concentrate was diluted with water at ratios of 1:6, 1:9, and 1:12. The three use-dilutions were then compared against the Comparison Example 4 formulation diluted at 1:3 to attain a desired viscosity and stripping power. The viscosities of the resulting stripper formulations were measured using a Brookfield viscometer and an HA No. 6 spindle at 100 rpm. The measured viscosities are shown below in Table 25:

TABLE 25

| Formula | Viscosity (cps) |
|---|---|
| Example 25 diluted 1:6 | 192.1 |
| Example 25 diluted 1:9 | 114.4 |
| Example 25 diluted 1:12 | 78.7 |
| Comparison Example 4 diluted 1:3 | 2.81 |

The strippers were evaluated on tiles which had been coated with either GEMSTAR LASER or ISI STAR finish at a 50 m2/L (2000 ft2/gallon) coating rate and aged at 50° C. for 5 days. Stripping performance was evaluated by determining the percentage of contact area stripped when a thin layer of the stripper was coated atop the tile and left in place for a 15 minute contact time, and when a thick layer of the stripper was placed atop the tile inside a foam ring and left in place for a 10 minute contact time. For the GEMSTAR LASER coated tiles, all four diluted stripper formulations removed 100% of the finish in the thin layer test. In the ring test, the Example 25 1:12 dilution removed approximately 90% of the finish while the other three stripper formulations removed 100% of the finish. For the ISI STAR coated tiles, the Example 25 1:6 dilution and a 1:6 dilution of the Comparison Example 4 stripper both removed 100% of the finish in both tests. The Example 25 1:9 dilution removed 60% of the finish in the ring test and 100% in the thin layer test. The Example 25 1:12 dilution removed 10% of the finish in the ring test and 70% in the thin layer test.

EXAMPLE 26

Using the method of Example 1, several concentrate formulations employing clay to stabilize the concentrate emulsion were prepared by mixing the ingredients shown below in Table 26:

TABLE 26

| | Formulation Number | | | | | | | |
|---|---|---|---|---|---|---|---|---|
| Ingredient | 26-1 | 26-2 | 26-3 | 26-4 | 26-5 | 26-6 | 26-7 | 26-8 |
| Benzyl alcohol | 73.6% | 73.0% | | | | 74.0% | 74.0% | |
| DOWANOL EPH ethylene glycol phenyl ether | | | 74.2% | 73.4% | 73.0% | | | 73.6% |
| GARAMITE ™ 1958 clay[1] | 0.75% | 1.50% | | 0.76% | 1.51% | 0.27% | 0.27% | 0.75% |
| K1C626 diutan gum[2] | 6.0% | 5.9% | 6.1% | 6.0% | 5.9% | | 6.0% | |
| Water | 4.9% | 4.9% | 4.9% | 5.2% | 4.9% | 4.9% | 4.9% | 4.9% |
| Monoethanolamine | 14.7% | 14.6% | 14.8% | 14.7% | 14.6% | 14.8% | 14.8% | 14.7% |
| K1C626 diutan gum | | | | | | 6.0% | | 6.0% |

[1]Southern Clay Products, Inc.
[2]CP Kelco.

The viscosities of the concentrates and dilutions were measured using spindle 6 at 50 rpm. The data are shown below in Table 27:

TABLE 27

| | Formulation Number | | | | | | | |
|---|---|---|---|---|---|---|---|---|
| Condition | 26-1 | 26-2 | 26-3 | 26-4 | 26-5 | 26-6 | 26-7 | 26-8 |
| % dispersed | 82.4% | 65.8% | 43.2% | 75.3% | 96.4% | 25.6% | 41.3% | 37.5% |
| Concentrate viscosity, cps | 105 | 112 | 113 | 292 | 700 | — | — | — |
| 1:8 dilution viscosity, cps | 750 | 460 | 800 | 900 | 1095 | — | — | — |
| 1:16 dilution viscosity, cps | 240 | 210 | 305 | 335 | 450 | — | — | — |

EXAMPLE 27

Using the method of Example 1, concentrate formulations employing copolymers of acrylic acid to stabilize the concentrate emulsion were prepared by mixing the ingredients shown below in Table 28:

TABLE 28

| | Formulation Number | | | | |
|---|---|---|---|---|---|
| Ingredient | 27-1 | 27-2 | 27-3 | 27-4 | 27-5 |
| DOWANOL EPH ethylene glycol phenyl ether | 77.8% | 74.1% | 77.2% | 73.4% | 76.8% |
| Carbopol EZ3A copolymer[1] | 0.26% | 0.25% | 1.0% | 0.95% | 1.5% |
| K1C626 diutan gum | 6.3% | 6.0% | 6.3% | 6.0% | 6.2% |
| Monoethanolamine | 15.6% | 14.8% | 15.4% | 14.6% | 15.4% |
| Water | | 4.8% | | 4.9% | |

[1]Noveon, Inc.

Formulations 27-1, 27-3 and 27-5 were shaken to redistribute any separated material, and the viscosity measured using a Brookfield viscometer and Spindle No. 6 at 50 rpm. Formulation 27-5 was also diluted 1:14 with water, and its viscosity measured in the same manner as for the concentrates. Set out below in Table 29 are the measured viscosities:

TABLE 29

| Condition | 27-1 | 27-2 | 27-3 | 27-4 | 27-5 |
|---|---|---|---|---|---|
| Concentrate appearance | Tan suspension | Tan suspension | Tan suspension | Tan suspension | Tan suspension |
| % dispersed | 23.2% | 32.8% | 45.8% | 45.4% | 50.7 |
| Concentrate viscosity, cps | 41 | — | 64 | — | 77 |
| 1:14 dilution viscosity, cps | — | — | — | — | 600 |

EXAMPLE 28

Using the method of Example 1, a series of use-site-thickened stripper formulations was prepared by mixing water, thickener and a commercial stripper concentrate (BRIGHT BLASI™ stripper, available from Ecolab, Inc.) using the orders of addition shown below in Table 30 and the amounts shown below in Table 31. In some instances the resulting mixtures formed precipitates, denoted in Table 31 using the notation "PPT". The viscosities of formulations which did not form precipitates were measured using a BROOKFIELD viscometer and an HA/HB No. 6 spindle operated at 20 rpm and are shown in Table 31.

TABLE 30

| | Order of Addition | | |
|---|---|---|---|
| Method | Ingredient, Order in Which Added | | |
| A | Water | Thickener | Stripper |
| B | Water | Stripper | Thickener |
| C | Stripper | Water | Thickener |
| D | Stripper | Thickener | Water |
| E | Thickener | Water | Stripper |
| F | Thickener | Stripper | Water |

TABLE 31

| | | Ingredient, Parts | | | | | | | |
|---|---|---|---|---|---|---|---|---|---|
| Run No. | Order of Addition | Crosslinkable Acrylic Acid Copolymer[1] | Neutralizable Acrylic Acid Copolymer[2] | Xanthan Gum[3] | Xanthan Gum[4] | PUR Polymer[5] | Stripper | Water | Viscosity (cps) |
| 1 | A | 0.5 | | | | | 14 | 85.5 | 435 |
| 2 | A | | 2 | | | | 14 | 84 | 1130 |
| 3 | A | | | 0.5 | | | 14 | 85.5 | PPT |
| 4 | A | | | | 0.5 | | 14 | 85.5 | PPT |
| 5 | B | | 2 | | | | 14 | 84 | PPT |
| 6 | B | | | 0.5 | | | 14 | 85.5 | PPT |
| 7 | B | 0.5 | | | | | 14 | 85.5 | PPT |
| 8 | B | | | | | 4.5 | 8.4 | 47.1 | 651 |
| 9 | C | | | 0.5 | | | 14 | 85.5 | PPT |
| 10 | C | | 2 | | | | 14 | 84 | PPT |
| 11 | C | | | | | 7.5 | 14 | 83.5 | 632 |
| 12 | D | | | | 0.5 | | 14 | 85.5 | 1980 |
| 13 | D | | | 0.5 | | | 14 | 85.5 | 1700 |
| 14 | E | | 2 | | | | 14 | 84 | 120 |
| 15 | F | | | | 0.5 | | 14 | 85.5 | 1360 |
| 16 | F | | | 0.5 | | | 14 | 85.5 | 1930 |

[1]CARBOPOL ™ EZ-4 (from Noveon, Inc.).
[2]ACUSOL ™ 820 acrylate polymer (from Rohm & Haas Co.).
[3]Type TNCS (from Jungbunzlauer Austria AG)
[4]KELZAN ™ ASX T (from CP Kelco).
[5]RHEOLATE ™ 266 (from Elementis Specialties, Inc.).

The results in Table 31 show that a variety of orders of addition could be used to prepare the disclosed thickened strippers. This facilitates packaging the disclosed strippers using a variety of configurations and containers.

EXAMPLE 29

Using the method of Example 1, a concentrate was prepared by mixing the ingredients shown below in Table 32:

TABLE 32

| Ingredient | Parts |
| --- | --- |
| Water | 11.1 |
| DOWANOL EPh ethylene glycol phenyl ether | 25 |
| NEODOL ™ 25-7 ethoxylated alcohol surfactant[1] | 1.0 |
| NEODOL 25-3 ethoxylated alcohol surfactant[1] | 1.0 |
| DEQUEST ™ 2010 1-Hydroxyethylidene-1,1,-diphosphonic acid[2] | 0.9 |
| ACUSOL 820 acrylate polymer | 11 |
| Monoethanolamine | 50.0 |

[1]Shell Chemicals.
[2]Solutia, Inc.

The viscosities of the concentrate and a 7% diluted solution were measured using a BROOKFIELD viscometer and an HA/HB No. 6 spindle operated at 20 rpm. The concentrate had a viscosity of about 3,200 cps and the 7% solution had a viscosity of 650 cps.

COMPARISON EXAMPLE 5

Example 33 from U.S. Pat. No. 5,419,848 was replicated by mixing the ingredients shown below in Table 33:

TABLE 33

| Ingredient | Amount, % |
| --- | --- |
| DOWANOL DPnB dipropylene glycol mono-n-butyl ether[1] | 20.0 |
| ACUSOL ™ 820 acrylate polymer | 3.0 |
| Monoethanolamine | 10.0 |
| Soft water | 67.0 |

[1]Dow Chemical Co.

The viscosities of the concentrate and a 1:10 diluted use solution were measured using a BROOKFIELD viscometer and an HA/HB No. 6 spindle operated at 20 rpm. The concentrate had a viscosity of 960 cps and the diluted use solution had a viscosity of 150 cps when measured immediately after mixing and an unchanged viscosity when measured 15 minutes after mixing.

EXAMPLE 30

Using the method of Example 1, a concentrate was prepared by mixing the ingredients as shown below in Table 34:

TABLE 34

| Ingredient | Parts |
| --- | --- |
| DOWANOL EPh ethylene glycol phenyl ether | 31.5 |
| Xanthan gum[1] | 4.5 |
| Monoethanolamine | 15 |
| Sodium hydroxide (50%) | 22 |
| Water | 26.5 |
| BYK ™-381 acrylic copolymer solution[2] | 0.5 |

[1]Type TNCS (from Jungbunzlauer Austria AG)
[2]Byk-Chemie.

The resulting concentrate was a uniform dispersion. When diluted to form a 7% diluted solution, the resulting mixture had a built viscosity of 534 cps when measured using a BROOKFELD viscometer and an HA/HB No. 6 spindle operated at 20 rpm.

EXAMPLE 31

Surfactant Additions

Thickened stripper concentrates containing the associative thickener ACUSOL 820 were combined with varying types and amounts of surfactants. The formulations and results are shown below in Table 35:

TABLE 35

| | Formulation Number | | | | | | | |
| --- | --- | --- | --- | --- | --- | --- | --- | --- |
| Ingredient | 31-1 | 31-2 | 31-3 | 31-4 | 31-5 | 31-6 | 31-7 | 31-8 |
| Water | 18 | 18 | 16 | 20 | 16.2 | 16.2 | 14.2 | 18.2 |
| DOWANOL EPh ethylene glycol phenyl ether | 75 | 75 | 75 | 75 | 75 | 75 | 75 | 75 |
| NEODOL 25-7 ethoxylated alcohol surfactant | 2 | | 2 | | 2 | | 2 | |
| NEODOL 25-3 ethoxylated alcohol surfactant | | 2 | 2 | | | 2 | 2 | |
| DEQUEST 2010 1-Hydroxyethylidene-1,1,-diphosphonic acid | | | | | 1.8 | 1.8 | 1.8 | 1.8 |
| ACUSOL 820 acrylate polymer | 30 | 30 | 30 | 30 | 30 | 30 | 30 | 30 |
| Monoethanolamine | 75 | 75 | 75 | 75 | 75 | 75 | 75 | 75 |
| Total: | 200 | 200 | 200 | 200 | 200 | 200 | 200 | 200 |
| Viscosity, 7% dilution, cps | 431 | 806 | 496 | 243 | 492 | 1467 | 1383 | 210 |

The results in Table 35 show that the addition of appropriate surfactants can provide improved or increased thickening efficiency. For example, the viscosity of Formulation No. 31-8 was improved from 210 cps to 1383 cps by the replacement of 4 parts of water with a mixture of 2 parts each of NEODOL 25-7 and NEODOL 25-3 nonionic surfactants (compare Formulation Nos. 31-7 and 31-8). Mixtures of water-soluble (e.g. NEODOL 25-7) and oil-soluble (e.g. NEODOL 25-3) nonionic surfactants also provided improved thickening efficiencies compared to use of the water-soluble surfactant alone (compare e.g., Formulation Nos. 31-1, 31-2 and 31-3, and Formulation Nos. 31-5, 31-6 and 31-7).

EXAMPLE 32

Altering Concentrate Viscosity without Adversely Affecting Use Viscosity

Thickened stripper concentrates containing the associative thickener ACUSOL 820 were combined with varying types and amounts of potassium salts. Doing so can decrease the viscosity of the concentrate without severely impacting the use dilution viscosity. This may for example provide a more fluid, easier to pour concentrate. The viscosities of the concentrate and a 7% diluted solution were measured using a BROOKFIELD viscometer and an HA/HB No. 6 spindle operated at 20 rpm. The formulations and results are shown below in Table 36:

TABLE 36

| Ingredient | Formulation Number | | | | | |
| --- | --- | --- | --- | --- | --- | --- |
| | 32-1 | 32-2 | 32-3 | 32-4 | 32-5 | 32-6 |
| DOWANOL EPh ethylene glycol phenyl ether | 25 | 25 | 25 | 25 | 25 | 25 |
| NEODOL 25-7 ethoxylated alcohol surfactant | 1 | 1 | 1 | 1 | 1 | 1 |
| NEODOL 25-3 ethoxylated alcohol surfactant | 1 | 1 | 1 | 1 | 1 | 1 |
| KOH | | 1.75 | | | | |
| KCl (20%) | | | 5 | | | |
| $KHCO_3$ | | | | 7.85 | | |
| $K_2CO_3$ | | | | | 4.75 | |
| Tetrapotassium pyrophosphate | | | | | | 6.75 |
| ACUSOL 820 acrylate polymer | 11 | 10 | 11 | 11 | 11 | 11 |
| Water | 12 | 11.25 | 7 | 4.15 | 7.25 | 5.25 |
| Monoethanolamine | 50 | 50 | 50 | 50 | 50 | 50 |
| Total: | 100 | 100 | 100 | 100 | 100 | 100 |
| Concentrate viscosity, cps | 3920 | 170 | 200 | 250 | 250 | 3360 |
| 7% dilution viscosity, cps | 650 | 430 | 210 | 110 | 680 | 440 |

The results in Table 36 show that the viscosity of the Formulation 32-1 concentrate could be lowered considerably without greatly decreasing the viscosity of a diluted use-solution.

EXAMPLE 33

Chelating Agent Additions

Stripper concentrates were prepared with and without chelating agents. The viscosities of the concentrates and diluted use-solutions prepared with water of varying hardness were measured using a BROOKFIELD viscometer and an HA/HB No. 6 spindle operated at 20 rpm. The formulations and results are shown below in Tables 37 and 38:

TABLE 37

| Ingredient | Formulation Number | |
| --- | --- | --- |
| | 33-1 | 33-2 |
| Water | 12 | 11.1 |
| DOWANOL EPh ethylene glycol phenyl ether | 25 | 25 |
| NEODOL 25-7 ethoxylated alcohol surfactant | 1 | 1 |
| NEODOL 25-3 ethoxylated alcohol surfactant | 1 | 1 |
| DEQUEST 2010 1-Hydroxyethylidene-1,1,-diphosphonic acid | 0 | 0.9 |
| ACUSOL 820 acrylate polymer | 11 | 11 |
| Monoethanolamine | 50 | 50 |
| Total | 100 | 100 |
| Water Type | Viscosity, 7% solution, cps | |

TABLE 37-continued

| Ingredient | Formulation Number | |
| --- | --- | --- |
| | 33-1 | 33-2 |
| 5 Grain water (tap) | 581 | 730 |
| 17 Grain water (hard) | 51 | 430 |
| Viscosity ratio (hard/tap) | 0.09 | 0.60 |

TABLE 38

| Ingredient | Formulation Number | | | | | | |
|---|---|---|---|---|---|---|---|
| | 33-3 | 33-4 | 33-5 | 33-6 | 33-7 | 33-8 | 33-9 |
| Water | 2.7 | 2.7 | 2.7 | 2.7 | 2.7 | 2.7 | 2.7 |
| DOWANOL EPh ethylene glycol phenyl ether | 11.25 | 11.25 | 11.25 | 11.25 | 11.25 | 11.25 | 11.25 |
| NEODOL 25-7 ethoxylated alcohol surfactant[1] | 0.3 | 0.3 | 0.3 | 0.3 | 0.3 | 0.3 | 0.3 |
| ACUSOL 820 acrylate polymer[2] | 4.5 | 4.5 | 4.5 | 4.5 | 4.5 | 4.5 | 4.5 |
| Monoethanolamine | 11.25 | 11.25 | 11.25 | 11.25 | 11.25 | 11.25 | 11.25 |
| Ethylene diamine tetraacetic acid | | 0.2 | | | | | |
| OPTIDOSE ™ 4210 polymaleic acid[2] | | | 0.6 | 3 | | | |
| ACUSOL 425N acrylate polymer[2] | | | | | 0.6 | 1.2 | 3 |
| Total: | 30 | 30.2 | 30.6 | 33 | 30.6 | 31.2 | 33 |
| Water Type | Viscosity, 7% solution (cps) | | | | | | |
| 5 grain water (Tap) | 750 | 576 | 787 | 61 | 685 | 361 | 243 |
| 17 grain water (Hard) | 305 | 408 | 328 | 61 | 380 | 239 | 178 |
| Viscosity ratio (Hard\Tap) | 0.41 | 0.71 | 0.42 | 1.00 | 0.55 | 0.66 | 0.73 |

[1]Shell Chemicals.
[2]Rohm & Haas Co.

The results in Table 37 and Table 38 show that the addition of various chelating agents could make the thickened stripper formulation insensitive or less sensitive to changes in dilution water hardness.

EXAMPLE 34

Linoleum Stripper

Linoleum flooring is difficult to strip without causing permanent discoloration or other damage to the flooring. A stripper is considered to be linoleum-safe if no discoloration or damage is observed after 10 minutes of stripper contact time. A thickened stripper formulation was prepared using triethanolamine and a reduced amount of monoethanolamine. The viscosities of the concentrate and a 7% diluted solution were measured using a BROOKFIELD viscometer and an HA/HB No. 6 spindle operated at 20 rpm. The formulation was applied to blue linoleum flooring and left in place for 10 minutes. No discoloration or damage was observed. The formulation was reapplied to the linoleum flooring and left in place for 20 minutes, at which time discoloration was observed. The formulation and results are shown below in Table 39:

TABLE 39

| Ingredient | Parts |
|---|---|
| DOWANOL EPh ethylene glycol phenyl ether | 37.5 |
| NEODOL 25-7 ethoxylated alcohol surfactant | 1.0 |
| KOH (45%) | 2.2 |
| ACUSOL 820 acrylate polymer | 15 |
| Water | 17.3 |
| Triethanolamine | 25 |
| Monoethanolamine | 2 |
| Total | 100 |
| Concentrate viscosity, cps | ~3500 |
| 7% dilution viscosity, cps | 486 |
| Discoloration or damage, 10 minute exposure | None |
| Discoloration or damage, 20 minute exposure | Onset of discoloration |

EXAMPLE 35

Dry Solid Stripper

A dry solid concentrate was prepared using sodium metasilicate as a binder. The viscosity of an 8.4% diluted use-solution was measured using a BROOKFIELD viscometer and an HA/HB No. 6 spindle operated at 20 rpm. The formulations and results are shown below in Table 40:

TABLE 40

| Ingredient | Parts |
|---|---|
| Sodium metasilicate pentahydrate | 90 |
| Xanthan gum[1] | 10 |
| Total | 100 |
| Concentrate viscosity, cps | Not Applicable |
| 8.4% dilution viscosity, cps | 1204 |

[1]Type TNCS (from Jungbunzlauer Austria AG)

Various modifications and alterations of this invention will be apparent to those skilled in the art without departing from the scope of this invention. It should be understood that this invention is not limited to the illustrative embodiments set forth above.

We claim:

1. A method for stripping a floor comprising:
   a) providing a substantially nonchlorinated concentrate comprising a floor finish dissolver and an at least partially water-unactivated water thickener;
   b) diluting the concentrate with water at an intended use location to activate the water thickener and noticeably increase within sixty minutes or less the viscosity of the resulting mixture;
   c) applying the resulting thickened stripper to a hardened floor finish atop a floor;
   d) allowing the applied stripper to soften or dissolve the floor finish; and
   e) removing the softened or dissolved finish from the floor.

2. A method according to claim 1 wherein the floor finish dissolver comprises benzyl alcohol.

3. A method according to claim 1 wherein the floor finish dissolver comprises an amine.

4. A method according to claim 3 wherein the floor finish dissolver comprises ethanolamine, diethanolamine or triethanolamine.

5. A method according to claim 1 wherein the floor finish dissolver comprises a dibasic ester, essential oil, dialkyl carbonate or mixture thereof.

6. A method according to claim 1 wherein the floor finish dissolver comprises ethylene glycol monobutyl ether, diethylene glycol monobutyl ether, ethylene glycol phenyl ether, propylene glycol phenyl ether, or mixture thereof.

7. A method according to claim 1 wherein the floor finish dissolver comprises a caustic material.

8. A method according to claim 1 wherein the floor finish dissolver comprises at least 40 percent of the total concentrate weight.

9. A method according to claim 1 wherein the floor finish dissolver comprises at least 80 percent of the total concentrate weight.

10. A method according to claim 1 wherein the floor finish dissolver comprises at least 95 percent of the total concentrate weight.

11. A method according to claim 1 wherein the water thickener comprises a gum, alginate, cellulose ether, polyethylene oxide, polyvinyl alcohol, polyvinyl pyrrolidone, starch, polyurethane, methyl vinyl ether/maleic anhydride copolymer, or mixture thereof.

12. A method according to claim 1 wherein the water thickener comprises Xanthan gum, diutan gum or gellan gum.

13. A method according to claim 1 wherein the water thickener comprises an acrylate copolymer.

14. A method according to claim 1 wherein the water thickener comprises a natural or synthetic clay.

15. A method according to claim 1 wherein the water thickener comprises about 0.1 to about 30 percent of the total concentrate weight as solids.

16. A method according to claim 1 wherein the water thickener comprises about 2 to about 20 percent of the total concentrate weight as solids.

17. A method according to claim 1 wherein the water thickener comprises about 3 to about 10 percent of the total concentrate weight as solids.

18. A method according to claim 1 wherein the water thickener is partially hydrated before the concentrate is diluted with water.

19. A method according to claim 1 wherein the concentrate is homogenous before dilution.

20. A method according to claim 1 wherein the concentrate is provided in a first container comprising the floor finish dissolver and a second container comprising at least partially water-unactivated water thickener.

21. A method according to claim 1 wherein the concentrate is diluted with water in at least a 1:1 by volume dilution ratio.

22. A method according to claim 1 wherein the concentrate is diluted with water in at least a 1:5 by volume dilution ratio.

23. A method according to claim 1 wherein the concentrate is diluted with water in at least a 1:10 by volume dilution ratio.

24. A method according to claim 1 wherein the composition is diluted with water by mixing in a bucket and is applied to the finish using a flat or string mop, squeegee, roller or trowel.

25. A method according to claim 1 wherein the viscosity noticeably increases within 15 minutes or less after dilution with water.

26. A method according to claim 1 wherein the composition is applied to a hardened floor finish atop a resilient flooring substrate.

27. A method for stripping a floor comprising:
a) providing a substantially nonchlorinated concentrate comprising a floor finish dissolver comprising benzyl alcohol, a dibasic ester, an essential oil, a dialkyl carbonate, ethylene glycol monobutyl ether, diethylene glycol monobutyl ether, ethylene glycol phenyl ether, propylene glycol phenyl ether, ethanolamine, caustic material or mixture thereof an at least partially water-unactivated water thickener comprising Xanthan gum, diutan gum, gellan gum, an acrylate copolymer, natural clay, synthetic clay, or mixture thereof and less than 3 percent water based on the concentrate weight;
b) diluting the concentrate with water at an intended use location to activate the water thickener and noticeably increase within sixty minutes or less the viscosity of the resulting mixture;
c) applying the resulting thickened stripper to a hardened floor finish atop a resilient flooring substrate;
d) allowing the applied stripper to soften or dissolve the floor finish; and
e) removing the softened or dissolved finish from the floor.

* * * * *

UNITED STATES PATENT AND TRADEMARK OFFICE
CERTIFICATE OF CORRECTION

PATENT NO. : 7,588,645 B2 Page 1 of 1
APPLICATION NO. : 11/396146
DATED : September 15, 2009
INVENTOR(S) : Griese et al.

It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 827 days.

Signed and Sealed this

Twenty-first Day of September, 2010

David J. Kappos
*Director of the United States Patent and Trademark Office*